(12) United States Patent
van Welzen et al.

(10) Patent No.: US 7,221,851 B1
(45) Date of Patent: May 22, 2007

(54) METHOD AND SYSTEM FOR DVD SMOOTH SEARCH TRANSITIONS

(75) Inventors: James Lewis van Welzen, Longmont, CO (US); Brian Dennis Falardeau, Boulder, CO (US); Jonathan Barton White, Fort Collins, CO (US)

(73) Assignee: Nvidia Corporation, Santa Clara, CA (US)

( * ) Notice: Subject to any disclaimer, the term of this patent is extended or adjusted under 35 U.S.C. 154(b) by 1130 days.

(21) Appl. No.: 09/994,428

(22) Filed: Nov. 26, 2001

(51) Int. Cl.
*H04N 5/91* (2006.01)
(52) U.S. Cl. .......................................... 386/68; 386/69
(58) Field of Classification Search .................... None
See application file for complete search history.

(56) References Cited

U.S. PATENT DOCUMENTS

| 5,377,051 A | 12/1994 | Lane et al. |
| 5,799,129 A | 8/1998 | Muto |
| 6,031,960 A * | 2/2000 | Lane ........................... 386/68 |
| 6,353,700 B1 | 3/2002 | Zhou |
| 6,532,232 B1 | 3/2003 | Goodwin, III |
| 6,952,521 B2 * | 10/2005 | Kelly et al. ................... 386/52 |
| 6,980,552 B1 | 12/2005 | Belz et al. |
| 7,003,597 B2 | 2/2006 | Georgiou et al. |

* cited by examiner

*Primary Examiner*—Thai Q. Tran
*Assistant Examiner*—Heather R. Jones

(57) ABSTRACT

Aspects of performing search transitions in a DVD system are described. The aspects include calculating an instantaneous frame rate, adjusting a timestamp of a frame based on the calculated instantaneous, and displaying the frame according to the adjusted timestamp.

13 Claims, 5 Drawing Sheets

FIG. 2

| | I0 | B1 | B2 | P3 | B4 | B5 | P6 | B7 | B8 | P9 | B10 | B11 | I12 | B13 | B14 | P15 | B16 | B17 | P18 | B19 | B20 | P21 | B22 | B23 | I24 |
|---|---|---|---|---|---|---|---|---|---|---|---|---|---|---|---|---|---|---|---|---|---|---|---|---|---|
| 1) | | | | | | | | | | | | | *I12* | | | | | | | | | | | | |
| 2) | | | | | | | | | | | | | I12 | | | | | | | | | | | | |
| 3) | | | | | | | | | | | | | I12 | | | | | | | | | | | | |
| 4) | | | | | | | | | | | | | I12 | | | | | | *P18* | | | | | | |
| 5) | | | | | | | | | | | | | I12 | | | *P15* | | | P18 | | | | | | |
| 6) | | | | | | | | | | | | | I12 | | | P15 | | | P18 | | | | | | |
| 7) | | | | | | | | | | | | | I12 | | | P15 | | | P18 | | | *P21* | | | |
| 8) | *I0* | | | | | | | | | | | | I12 | | | P15 | | | P18 | | | P21 | | | |
| 9) | I0 | | | | | | *P6* | | | | | | I12 | | | P15 | | | P18 | | | P21 | | | |
| 10) | I0 | | | *P3* | | | P6 | | | | | | I12 | | | P15 | | | P18 | *B19* | *B20* | P21 | | | |
| 11) | I0 | | | P3 | | | P6 | | | | | | I12 | | | P15 | | *B17* | P18 | B19 | B20 | P21 | *B22* | *B23* | *I24* |
| 12) | I0 | | | P3 | | | P6 | | | | | | I12 | | | P15 | *B16* | B17 | P18 | B19 | B20 | P21 | B22 | B23 | I24 |
| 13) | I0 | | | P3 | | | P6 | | | | | | I12 | | *B14* | P15 | B16 | B17 | P18 | B19 | B20 | P21 | B22 | B23 | I24 |
| 14) | I0 | | | P3 | | | P6 | | | | | | I12 | *B13* | B14 | P15 | B16 | B17 | P18 | B19 | B20 | P21 | B22 | B23 | I24 |
| 15) | I0 | | | P3 | | | P6 | | | | | | I12 | B13 | B14 | P15 | B16 | B17 | P18 | B19 | B20 | P21 | B22 | B23 | I24 |
| 16) | I0 | | | P3 | | | P6 | | | | | *B11* | I12 | B13 | B14 | P15 | | | | | | | | | |
| 17) | I0 | | | P3 | | | P6 | | | | | | | | | | | | | | | | | | |
| 18) | I0 | | | P3 | | | | | | *P9* | | | | | | | | | | | | | | | |

FIG. 4

METHOD AND SYSTEM FOR DVD SMOOTH SEARCH TRANSITIONS

CROSS-RELATED APPLICATIONS

The present application is related to U.S. patent application Ser. No. 09/994,429, entitled "Method and System for DVD Smooth Rewind," and U.S. patent application Ser. No. 09/995,377, entitled "Method and System for DVD Single Frame Stepping Backwards," both assigned to the assignee of the present application, and both filed on Nov. 26, 2001.

FIELD OF THE INVENTION

The present invention relates to DVD players, and more particularly to reverse playback in DVD players.

BACKGROUND OF THE INVENTION

The DVD (Digital Versatile Disk) format was designed by various members of the consumer electronics industry as a means of storing high quality audio-video content (e.g., a feature length film) on a single disk. To facilitate such efficient storage, the DVD format uses contemporary compression technologies to reduce the sizes of the video and audio bit streams comprising the content.

The DVD format employs the ISO MPEG-2 standard to compress video. MPEG-2 represents video content as a compressed series of frames. Each frame is a rectangular array of picture elements (pixels) depicting the content at a particular instant in time. Thus playback consists of decompressing and then displaying this series of frames.

In conventional DVD players, the playback of DVD content is typically implemented in one of three ways: using dedicated hardware, using a software implementation, or using a combination of software and hardware. The most common or conventional implementation takes the form of a consumer electronics components with limited resources targeted exclusively at DVD playback. Less common or conventional implementations take the form of PC-based implementations or Game Consoles (e.g., Sony PLAYSTATION2 and Microsoft X-BOX) which, because they target multiple functions, tend to have more extensive resources.

Although the user primarily plays DVD content forwards and at the display rate of the original content, there are circumstances where a user may want to display frames either backwards or at a rate other than the normal display rate or both backwards and at a rate other than the normal display rate. These include playback features popularized by VCRs, e.g., slow motion, backwards play, single frame stepping forwards and backwards, as well as fast forward and rewind at various rates. The realization of alternate forms of playback, however, is hindered by both the nature of MPEG-2 compression and of typical DVD players.

The MPEG-2 video standard employs three types of compressed frames: intra-frames (I-frames), predictive frames (P-frames), and bi-directionally predictive frames (B-frames). I-frames have no dependencies. Thus, an I-frame is self-contained and includes all information necessary to reproduce the associated original frame. P-frames may have forward dependencies, i.e., a P-frame is not self-contained. It may re-use information from the preceding decompressed reference frame (where a reference frame is either an I-frame or another P-frame). Thus, a playback implementation must decode reference frame preceding a P-frame before it decodes the P-frame itself and must keep the preceding reference frame resident in memory throughout the decoding of a P-frame. For the B-frames, B-frames are not self-contained and may have forward and backward dependencies, such that it may re-use information from either the preceding or the subsequent decompressed reference frame. Thus, a playback implementation must decode the reference frames both preceding and following a B-frame before it decodes the B-frame itself and must keep both the preceding and subsequent reference frames resident in memory throughout the decoding of a B-frame.

In summary, a playback implementation respects the dependencies between frames by decoding a frame's references before decoding the frame itself. It also keeps the required references in memory until all frames requiring the references are decoded.

Normally, a playback implementation maintains four frame buffers (i.e., arrays of memory) of MPEG-2 video at any one time:

(1) currently decoded frame (2) forwards reference. The reference preceding the currently decoded frame. Sometimes co-incident with the currently displayed frame.

(3) backwards reference. The reference following the currently decoded frame.

(4) currently displayed frame. This is distinct from the currently decoded frame to prevent the player from updating a frame while it is being displayed which causes an undesirable visual artifact called "tearing".

The maintenance of only four or five frame buffers helps to limit the memory resources used in a DVD player, while providing sufficient forwards playback. Four (or even five) frames, however, is normally not sufficient for smooth backwards playback of MPEG-2. Rather, DVD players currently avoid decoding P or B frames when playing backwards, and only decode the self-contained I-frames. This leads to decoding less than 10% of the frames and subsequently to jerky, low frame-rate, backwards play. Further, decoding only the I-frames prevents DVD players from single stepping frames backwards. While an implementation could repeat a process of starting from the last I-frame and progressing forward using only four frames, the process is laborious, requiring repetition for every new backwards frame at the normal playback speed, which requires decoding capacity far in excess of even current PC-based implementations.

Furthermore, most DVD players output to televisions or other displays with fixed display rates. For instance, the PAL and NTSC television standards mandate display rates of 25 and 29.97 frames per second. This is sufficient for normal speed playback which is limited, by the DVD standard, to PAL and NTSC rates. This limitation, however, prevents higher frame rate display during fast forward or rewind. For instance, if the player produces 60 frames of video per second in a 2× fast forward mode only 30 (i.e., every other frame decoded) may be displayed on an NTSC television. Further, given fixed frame rates, these players cannot smoothly vary the rate in a transition from one rate (say normal speed) to another (say 2× speed).

Accordingly, what is needed are a system and method for smooth rewind, single frame stepping backwards, and smooth search transitions in a DVD implementation. The present invention addresses such needs.

SUMMARY OF THE INVENTION

Aspects of performing smooth search transitions in a DVD system are described. The aspects include calculating an instantaneous frame rate, adjusting a timestamp of a frame based on the calculated instantaneous, and displaying the frame according to the adjusted timestamp.

Through the present invention, smooth search transitions during playback can be achieved. With the use of adjusted timestamps, it appears visually as a smooth increase or decrease in playback speed when transitioning between speeds (e.g., 0.5×, 1×, 2×, 4×, 8×), rather than the typical jerk. These and other advantages of the aspects of the present invention are more readily understood in conjunction with the following detailed description and accompanying drawings.

BRIEF DESCRIPTION OF THE DRAWINGS

FIG. 2 illustrates an example of I-, P-, and B- frames representing an original sequence of 24 frames.

FIG. 4 illustrates an example step-by-step reconstruction diagram for the original sequence of frames in accordance with the present invention.

DETAILED DESCRIPTION

The present invention relates to smooth search transitions in a DVD player system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
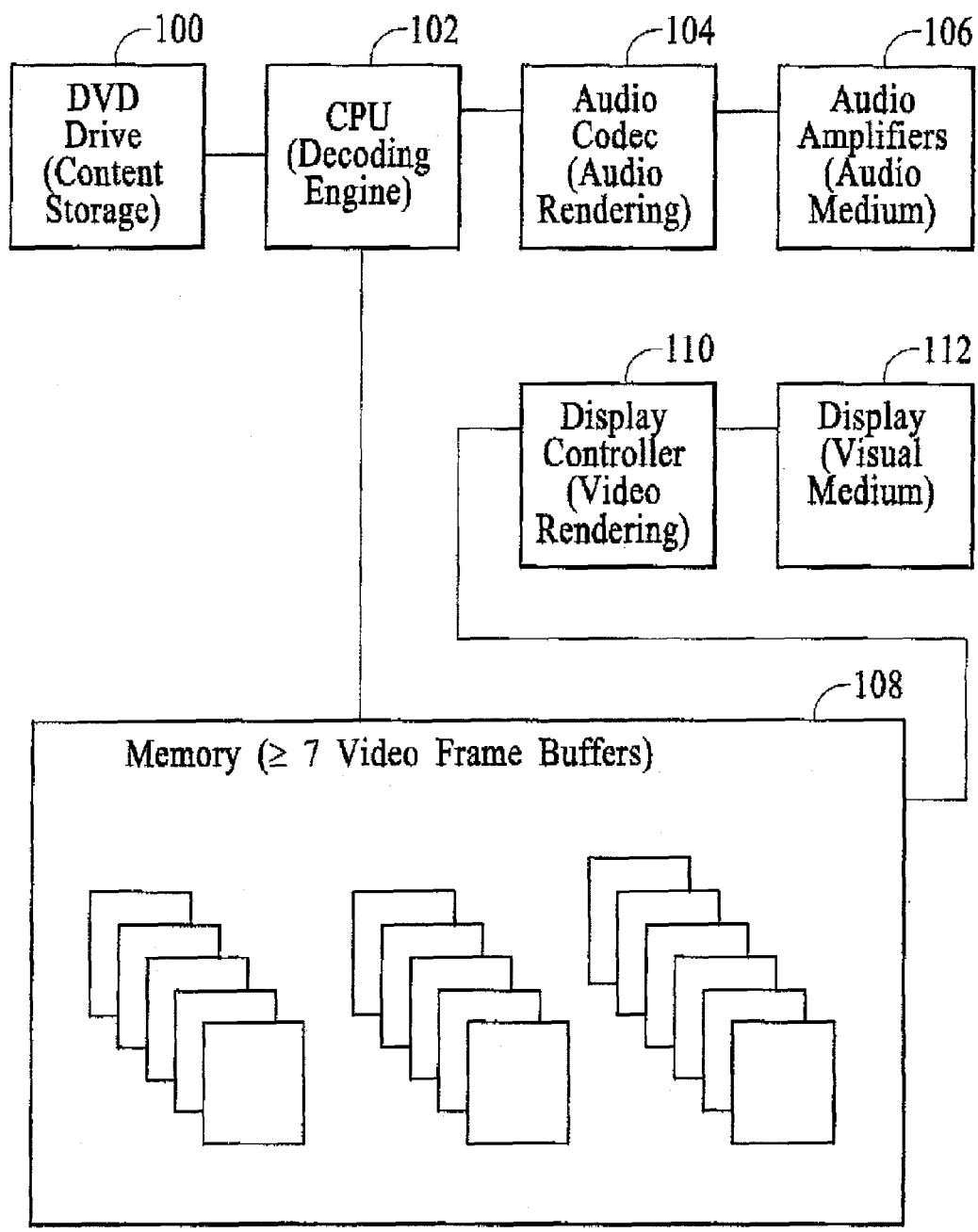
FIG. 1 illustrates a block diagram of a DVD player system with at least seven frame buffers in accordance with the present invention.

The present invention provides aspects of displaying all frames, i.e., not just the I-frames, during the backwards playback in a DVD player. These aspects include smooth rewind, single frame stepping backwards, and smooth search transitions. FIG. 1 illustrates a block diagram of a DVD player system for implementing the aspects of the present invention. Actual implementations of this DVD player include but are not limited to PC-based DVD players and game console-based DVD systems (e.g., Sony PLAYSTATION, Microsoft X-BOX). As shown, the DVD player system includes a DVD Drive (content storage) 100, a decoding engine 102, e.g., a CPU, for performing the processing of the present invention, an Audio Codec (audio rendering) 104, Audio Amplifiers (audio medium) 106, Memory 108, comprising at least 7 video frame buffers, Display Controller (video rendering) 110, and a Display 112 (visual medium). In a preferred embodiment, the at least 7 frame buffers are allocated either from system memory or the video memory of any resident graphics hardware, as is well appreciated by those skilled in the art.

Smooth Rewind

Figure 3:
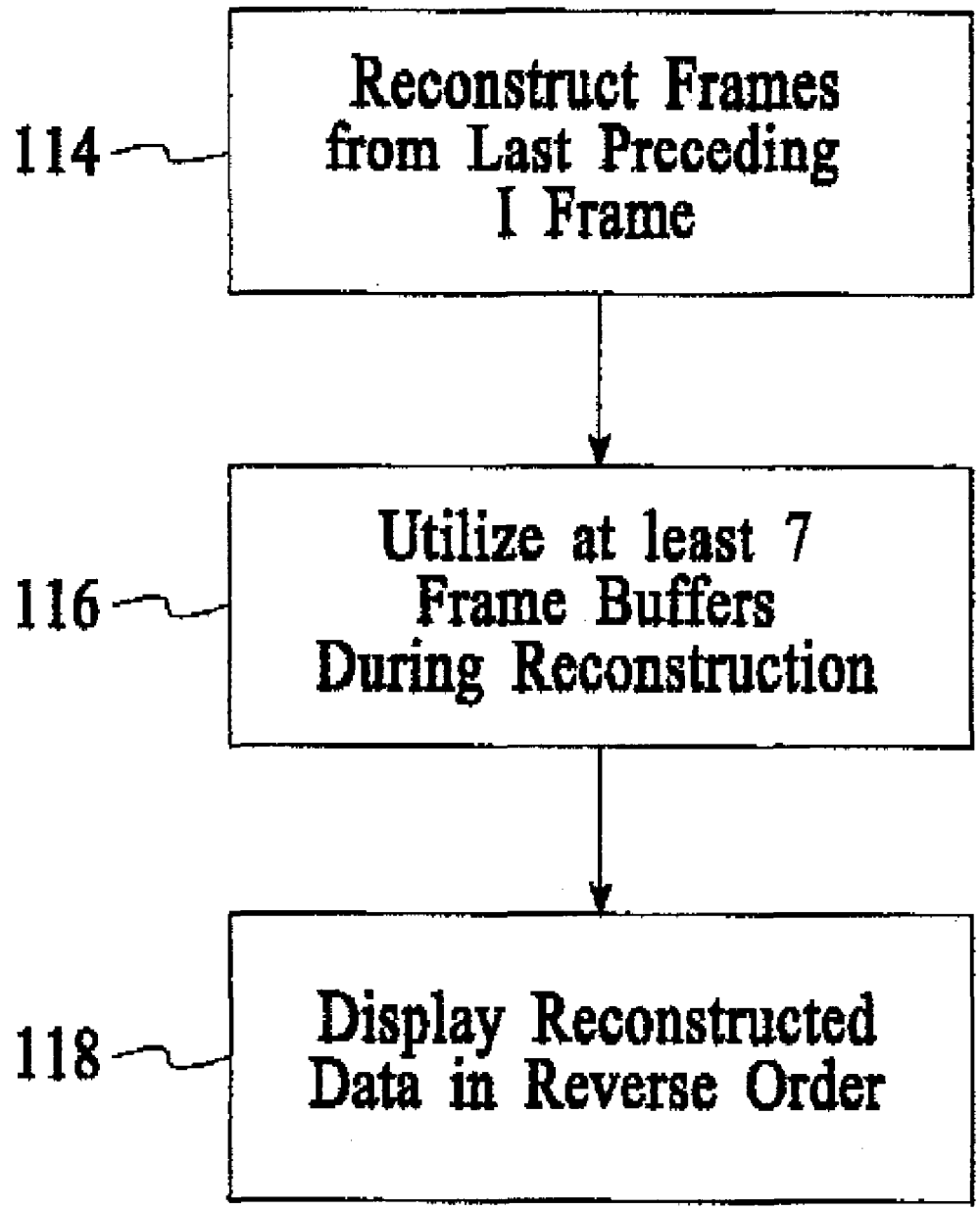
FIG. 3 illustrates a block flow diagram for smooth reverse playback in the DVD player system in accordance with the present invention.

The DVD standard for the operation of the DVD player system prescribes that I-frames occur no less frequently than every 12 frames, as demonstrated by an example sequence of 24 original frames shown in FIG. 2. In accordance with the present invention, smooth backwards playback of such a sequence occurs as described with reference to the overall block flow diagram of FIG. 3 and the step-by-step reconstruction diagram of FIG. 4. Referring to FIG. 3, to provide for the reverse playback from a currently displayed frame, reconstruction occurs from a last I-frame preceding a currently displayed frame to the frame immediately preceding the currently displayed frame (step 114). The process further includes utilizing at least 7 frame buffers to support the reconstruction (step 116). The data is displayed from memory in reverse order to provide a smooth playback of all the frames (step 118).

By way of example, for the process of FIG. 3, a sequence of 24 original frames, as shown in FIG. 2, is reconstructed as demonstrated by the step-by-step diagram of FIG. 4. In the diagram of FIG. 4, at each step, a decode is begun on a frame indicated in italicized type with the decode completed at the start of a next frame decode, a frame indicated in boldfaced type is displayed, and a frame indicated with strikethrough type is released from memory. Frame numbers indicated in normal type are held in memory.

In the example of FIG. 4, the process of reverse playback begins with a first frame, I24, as the one immediately preceding a currently displayed frame. The I-frame preceding I24 is determined to be I12, which is shown as being decoded in step 1). With I12 decoded in step 2), it is able to provide the reference data for the frame P15, which starts its decode. With P15 decoded in 3), it is able to provide the reference data for the frame P18, which starts its decode. In 4), P18 is decoded and provides the reference data necessary for starting the decode of frame P21. In 5), the data needed for frame I24 is present and its decode is started. Continuing with 6), the I24 frame is displayed, and its data, together with the data from P21, provides the needed reference data to begin the decode of frame B23. Thus, in 7), the decoded B23 data is displayed and the decode of B22 begins. With B22 decoded and displayed in 8), the memory for B23 and I24 data is released, since neither will be used in any further decode. Further, since the next preceding frame P21 is already decoded, a next preceding I frame, I0, is located and decoded in 8). The data decoded for P21 is displayed in 9), while the decode for the B20 frame is begun and the memory for B22 is released. In 10), B20 is displayed while the decode of B19 is begun. In 11), B19 is displayed, the memory for B20 and P21 is released, and the decode of P3 is begun. In 12), P18 is displayed, the decode of B17 is begun, and the memory for B19 is released. With B17 decoded, it is displayed in 13), while the decode of B16 begins. The decoded B16 is displayed in 14), allowing the release of memory for its reference P18. Also in 14), the memory for B17 is released and the decode of P6 is begun. In 15), P15 is displayed, the decode for B14 is begun, and the memory for B16 is released. Once decoded, B14 is displayed in 16), and the decode for B13 is begun. B13 is then displayed in 17), the memory for B14 and P15 is released, and the decode of P9 occurs. In 18), I12 is finally displayed, the memory for B13 is released, and the decode of B11 begins.

The process demonstrated by FIG. 4 is cyclic. Thus, continuing with steps 19–30 would repeat steps 7–18 except on differently numbered frames, where the indices for the frame number are decremented by 12 every cycle, as is well appreciated by those skilled in the art. Further, in each step of the diagram, there are never more than 7 frames being stored in memory. For example, in step 1), only 1 buffer is allocated to store I12. In step 4, four buffers are allocated to store I12, P15, P18, and P21. In step 10), seven buffers are allocated to store I0, I12, P15, P18, B19, B20, and P21. Thus, the reconstruction for backwards playback need not use more than 7 frame buffers during any one step. Of course, more buffers could be used if available and desired.

The decode process of the present invention operates on sets of 12 frames, since the DVD standard prescribes that I-frames occur no less frequently than every 12 frames. At a high level, the player appears to decode the sets in reverse order. At a low level, the player decodes each frame within a set in forwards order, which computationally is well within the existing capacity of a DVD player system, as represented in FIG. 1.

Single Frame Stepping Backwards

Figure 5:
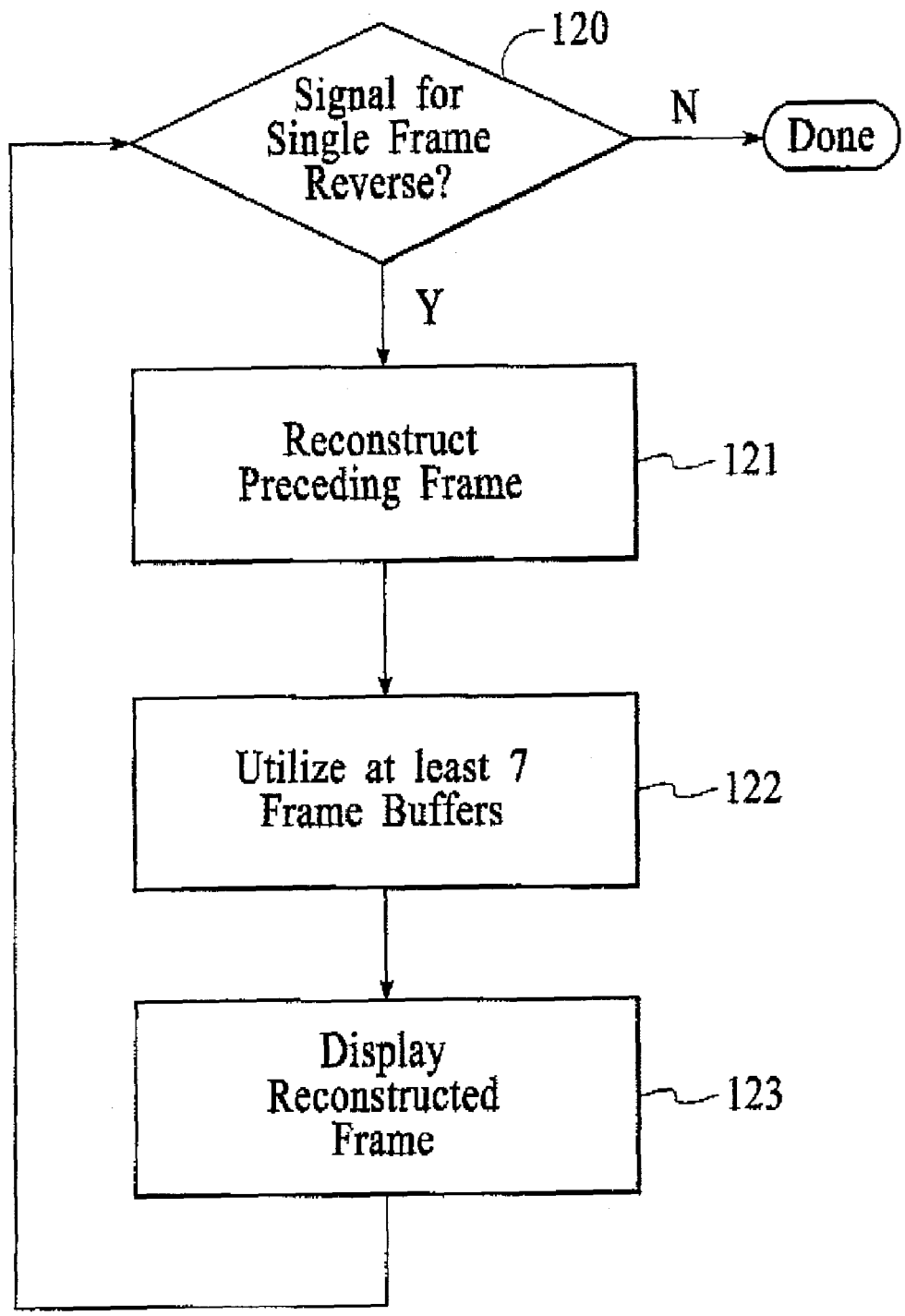
FIG. 5 illustrates a block flow diagram for a single frame backwards playback in accordance with a further aspect of the present invention.

In a further aspect, the reverse playback is modified to allow the DVD player system to display one frame at a time in reverse order. The implementation occurs as described above for smooth rewind, with the following differences, as shown in FIG. 5. The DVD player system waits for a signal from the user to step the frame backward (step 120) before starting the reconstruction of a preceding frame (step 121). The data is stored utilizing one of at least seven frame buffers (step 122). Once reconstructed, the frame is displayed (step 123) and the process returns to step 120 to await another signal indicating selection for single frame reverse.

Smooth Search Transitions

In yet another embodiment, the present invention provides for smooth search transitions in a DVD player system, i.e., transitions between one playback rate and another without a noticeable jerk. The limited frame rates of some displays, such as televisions, force DVD players to make the transition between one display rate and another abruptly. However, the frame rates of PC displays, for example, are flexible and thus, a PC-based DVD player system can make the transition between display rates smoothly. Thus, the aspect of smooth search transitions preferably is utilized in a DVD player system that provides data to displays that do not have limited frame rates.

In order to achieve smooth transition between display rates, the present invention linearly interpolates between one rate and another over a brief transition interval. Thus, with a given starting rate (r0), a new rate (r1), the time the player is aware of the eminent transition (t0), and the time of the scheduled transition (t1), the transition interval is defined to be the time between t0 and t1+(t1−t0), which provides a sufficient interval to maintain the overall average rate and in turn keeps audio and video in sync. A parametric equation R(t) is defined for the rate over the interval where the parametric u varies from 0 to 1, where 0 represents t0 and 1 represents t1+(t1−t0).

$$U=(\text{now}-t0)/t1-t0)$$

$$R(t)=r0+u(r1-r0)$$

Figure 6:
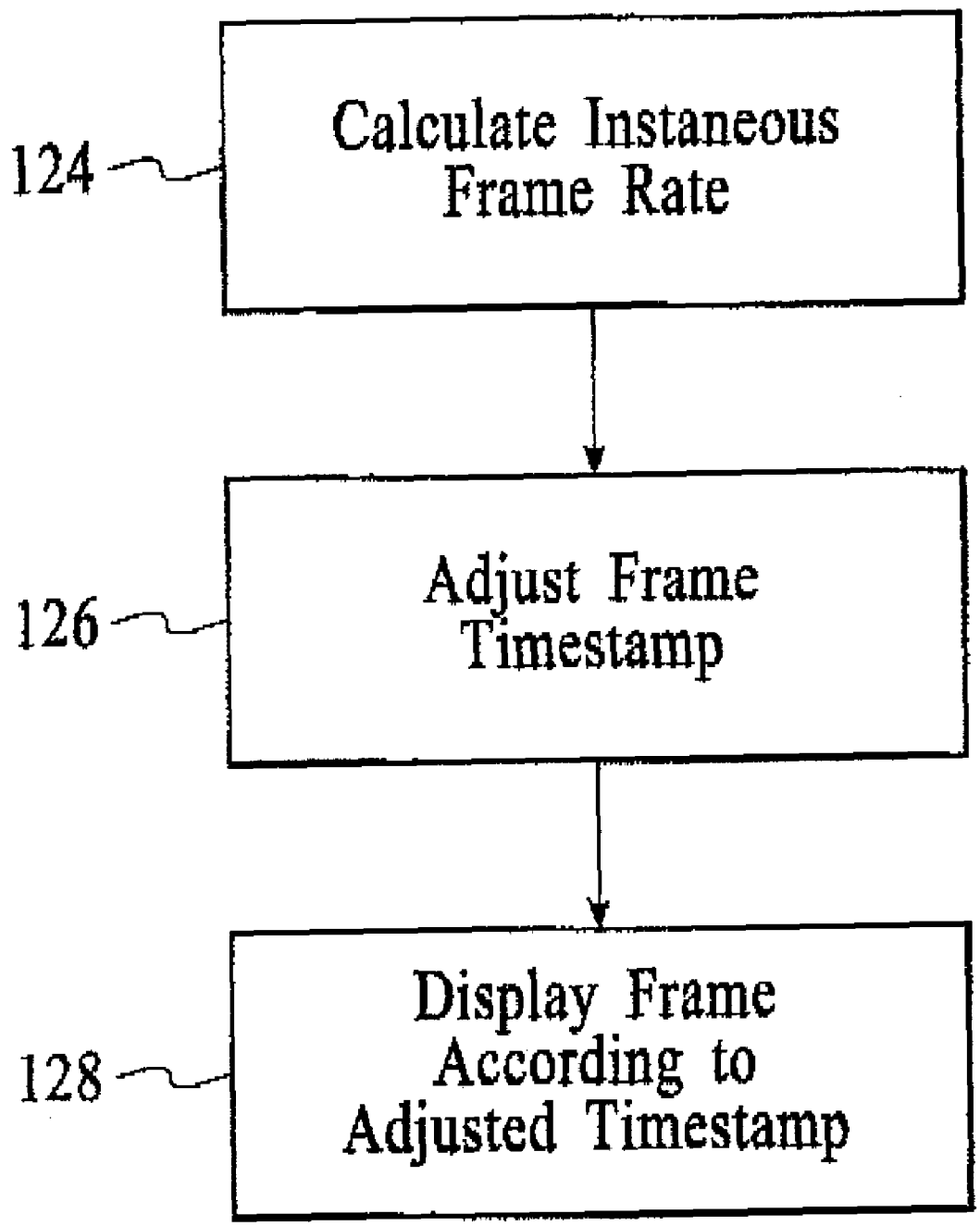
FIG. 6 illustrates a block flow diagram for smooth frame search transistions in accordance with another aspect of the present invention.

FIG. 6 illustrates a block flow diagram for performing smooth search transitions. As shown, an instantaneous rate is calculated for every frame using the frame's original timestamp as input (i.e., the "now" variable above) (step 124). The resulting rate is then used to calculate an adjusted timestamp for the frame (step 126). The frame is then displayed according to the adjusted timestamp (step 128).

Thus, when the DVD player system delivers the frames with the adjusted timestamps, it appears visually as a smooth increase or decrease in playback speed when transitioning between speeds (e.g., 0.5×, 1×, 2×, 4×, 8×), rather than the typical jerk.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for performing smooth search transitions in a digital versatile disc (DVD) system, the method comprising:

determining a first frame rate and a second frame rate for which a frame rate transition is to be made;

calculating an instantaneous frame rate to produce a calculated instantaneous frame rate, wherein said calculated instantaneous frame rate is between said first frame rate and said second frame rate;

adjusting a timestamp of a frame based on said calculated instantaneous frame rate to produce an adjusted timestamp; and displaying the frame according to the adjusted timestamp.

2. The method of claim 1 wherein the calculating further comprises determining a change in rate between said first frame rate and said second frame rate.

3. The method of claim 1 further comprising determining a transition interval for said frame rate transition.

4. The method of claim 3 wherein the transition interval comprises an interval sufficient to maintain audio and video synchronization.

5. A digital versatile disc (DVD) system with smooth search transition capabilities, the system comprising:

a display device for displaying frames;

a decoding engine for determining a first frame rate and a second frame rate for which a frame rate transition is to be made, for calculating an instantaneous frame rate to produce a calculated instantaneous frame rate, for adjusting a timestamp of a frame based on said calculated instantaneous frame rate to produce an adjusted timestamp, and for providing the frame to the display device according to the adjusted timestamp; and wherein said calculated instantaneous frame rate is between said first frame rate and said second frame rate.

6. The DVD system of claim 5 wherein the decoding engine further determines a change in rate between said first frame rate and said second frame rate.

7. The DVD system of claim 5 wherein the decoding engine further determines a transition interval for said frame rate transition.

8. The DVD system of claim 7 wherein the transition interval comprises an interval sufficient to maintain audio and video synchronization.

9. The DVD system of claim 5, wherein at least one of said display device and said decoding engine comprise computer system components.

10. A computer readable medium comprising computer program instructions for causing a digital versatile disc (DVD) system to perform a method of executing search transitions, the method comprising:

determining a first frame rate and a second frame rate for which a frame rate transition is to be made;

calculating an instantaneous frame rate to produce a calculated instantaneous frame rate, wherein said calculated instantaneous frame rate is between said first frame rate and said second frame rate;

adjusting a timestamp of a frame based on said calculated instantaneous frame rate to produce an adjusted timestamp; and displaying the frame according to the adjusted timestamp.

11. The computer readable medium of claim 10 wherein the calculating further comprises determining a change in rate between said first frame rate and said second frame rate.

12. The computer readable medium of claim 11, wherein the method further comprises determining a transition interval for said frame rate transition.

13. The computer readable medium of claim 12 wherein the transition interval further comprises an interval sufficient to maintain audio and video synchronization.

* * * * *